(12) United States Patent
Mori et al.

(10) Patent No.: US 10,641,560 B2
(45) Date of Patent: May 5, 2020

(54) CERAMIC MEMBER AND JOINT STRUCTURE OF METAL MEMBERS

(71) Applicant: TOYOTA JIDOSHA KABUSHIKI KAISHA, Toyota-shi, Aichi-ken (JP)

(72) Inventors: Rentaro Mori, Kasugai (JP); Sumio Kamiya, Toyota (JP); Hitoshi Ishii, Chita (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 968 days.

(21) Appl. No.: 15/030,655

(22) PCT Filed: Jan. 30, 2015

(86) PCT No.: PCT/JP2015/052653
§ 371 (c)(1),
(2) Date: Apr. 20, 2016

(87) PCT Pub. No.: WO2015/115593
PCT Pub. Date: Aug. 6, 2015

(65) Prior Publication Data
US 2016/0273846 A1    Sep. 22, 2016

(30) Foreign Application Priority Data

Feb. 3, 2014 (JP) .................. 2014-018922

(51) Int. Cl.
*F28F 9/18*    (2006.01)
*F28F 7/02*    (2006.01)
(Continued)

(52) U.S. Cl.
CPC ............... *F28F 9/185* (2013.01); *C03C 3/06* (2013.01); *C03C 8/02* (2013.01); *C03C 8/24* (2013.01);
(Continued)

(58) Field of Classification Search
CPC . F16L 13/08; C04B 2237/125; B23K 1/0012; B23K 1/0008; B23K 2101/14;
(Continued)

(56) References Cited

U.S. PATENT DOCUMENTS 3,674,586 A * 7/1972 Rimkus ............... C04B 37/028
156/196
4,171,832 A * 10/1979 Metcalfe ............... F28F 21/04
165/81
(Continued)

FOREIGN PATENT DOCUMENTS

CN  103193500 A  7/2013
JP  2001-220267 A  8/2001
(Continued)

*Primary Examiner* — Aaron M Dunwoody
(74) *Attorney, Agent, or Firm* — Hunton Andrews Kurth LLP

(57) ABSTRACT

A joint structure jointing a ceramic member and a metal member is a joint structure jointing a ceramic member and a metal member that are provided in a device provided on a portion through which gas passes. The joint structure has a joint portion that joints the ceramic member and the metal member. The joint portion includes a glass portion made of a glass and a metal solder portion having higher corrosion resistance with respect to the gas than the glass. An area where the metal solder portion contacts to the gas is larger than an area where the glass portion contacts to the gas.

3 Claims, 3 Drawing Sheets

(51) Int. Cl.
   *F28F 21/04*   (2006.01)
   *F28D 7/10*    (2006.01)
   *F28D 21/00*   (2006.01)
   *C04B 37/02*   (2006.01)
   *F02B 29/04*   (2006.01)
   *C03C 8/24*    (2006.01)
   *C03C 3/06*    (2006.01)
   *C03C 8/02*    (2006.01)
   *C04B 35/565*  (2006.01)
   *C04B 35/66*   (2006.01)

(52) U.S. Cl.
   CPC ............ *C04B 35/565* (2013.01); *C04B 35/66* (2013.01); *C04B 37/02* (2013.01); *F02B 29/0462* (2013.01); *F28D 7/106* (2013.01); *F28D 21/0003* (2013.01); *F28F 7/02* (2013.01); *F28F 21/04* (2013.01); *C03C 2201/06* (2013.01); *C03C 2207/02* (2013.01); *C04B 2235/3826* (2013.01); *C04B 2237/10* (2013.01); *C04B 2237/125* (2013.01); *C04B 2237/365* (2013.01); *C04B 2237/406* (2013.01); *C04B 2237/59* (2013.01); *Y02T 10/146* (2013.01)

(58) Field of Classification Search
   CPC . B23K 2103/52; B23K 2103/54; F28F 9/185; F28F 7/02; F28F 21/04
   USPC ..... 285/289.1, 289.5, 911; 228/122.1–124.7, 228/183
   See application file for complete search history.

(56) References Cited

U.S. PATENT DOCUMENTS

| | | | | |
|---|---|---|---|---|
| 4,875,990 | A | * | 10/1989 | Kodachi ............ G01N 27/4067 204/408 |
| 4,931,619 | A | * | 6/1990 | Ogata ..................... F23Q 7/001 123/145 A |
| 5,189,280 | A | * | 2/1993 | Okazaki .................. F23Q 7/001 123/145 R |
| 2001/0027960 | A1 | | 10/2001 | Makino et al. |
| 2012/0247732 | A1 | | 10/2012 | Suzuki et al. |

FOREIGN PATENT DOCUMENTS

| | | |
|---|---|---|
| JP | 2007-290027 A | 11/2007 |
| WO | 2011/071161 A1 | 6/2011 |

* cited by examiner

CERAMIC MEMBER AND JOINT STRUCTURE OF METAL MEMBERS

CROSS-REFERENCE TO RELATED APPLICATIONS

This is a national phase application based on the PCT International Patent Application No. PCT/JP2015/052653 filed Jan. 30, 2015, claiming priority to Japanese Patent Application No. 2014-018922 filed Feb. 3, 2014, the entire contents of both of which are incorporated herein by reference.

TECHNICAL FIELD

The present invention relates to a ceramic member and a joint structure of metal members.

BACKGROUND ART

Conventionally, there are known various devices having a ceramic member and a metal member. For example, Patent Document 1 discloses a heat exchanger that is provided on a portion through which gas such as exhaust gas of an internal combustion engine passes and performs heat exchange between the gas and coolant, as the various devices. In concrete, the heat exchanger of Patent Document 1 has a metal housing (called casing in Patent Document 1) and a heat exchanging body (called honeycomb structure in Patent Document 1) that is located in the housing and made of ceramic. Gas passes through inside of the heat exchanging body. A coolant passage is provided on an outer circumference of the heat exchanging body. In the heat exchanger of Patent Document 1, the heat exchanging body corresponds to the ceramic member, and the housing corresponds to the metal member.

PRIOR ART DOCUMENTS

Patent Document

Patent Document 1: International Publication No. 2011/071161

SUMMARY OF THE INVENTION

Problems to be Solved by the Invention

When the heat exchanger of Patent Document 1 is manufactured, it is necessary to joint the ceramic member and the metal member. It is thought that a jointing with metal solder that is widely used for jointing a metal member and a metal member is adapted to the joint structure jointing the ceramic member and the metal member, and the ceramic member is jointed to the metal member with a joint portion made of only metal solder. However, in this case, wettability of the metal solder with respect to the ceramic member is not sufficiently high. It is possible that the joint portion cannot be jointed to the ceramic member. And, as in the case of a device provided on a portion through which gas passes such as the heat exchanger of Patent Document 1, it is demanded that the joint structure jointing the ceramic member and the metal member has high corrosion resistance with respect to the gas.

The present invention has an object to provide a joint structure jointing a ceramic member and a metal member that secures jointing property of a joint portion and has high corrosion resistance with respect to gas.

Means for Solving the Problems

A joint structure jointing a ceramic member and a metal member of the present invention is a joint structure that joints a ceramic member and a metal member of a device provided on a portion through which gas passes. The joint structure is characterized by including a joint portion that joints the ceramic member and the metal member, wherein the joint portion includes a glass portion made of a glass and a metal solder portion having higher corrosion resistance with respect to the gas than the glass, wherein an area where the metal solder portion contacts to the gas is larger than an area where the glass portion contacts to the gas.

The glass has sufficient wettability with respect to the metal member and higher wettability with respect to the ceramic member than the metal solder. Therefore, in the joint structure of the ceramic member and the metal member of the present invention, the joint portion has the glass portion. Therefore, it is possible to secure jointing property of the joint portion, compared to a case where the joint portion is made of only metal solder. And, in the joint structure of the ceramic member and the metal member, the area where the metal solder portion contacts to the gas is larger than the area where the glass portion contacts to the gas. Therefore, the joint structure has high corrosion resistance with respect to the gas.

In the above-mentioned structure, the gas may be an exhaust gas of an internal combustion engine, the exhaust gas may pass through inside of the ceramic member, the metal member may be jointed to a first edge portion of the ceramic member on an upstream side in a flow direction of the exhaust gas and to a second edge portion of the ceramic member on a downstream side in the flow direction with the joint portion, the metal solder portion may be located on the upstream side with respect to the glass portion in the flow direction of the exhaust gas, in the joint portion jointing the first edge portion and the metal member, and the metal solder portion may be located on the downstream side with respect to the glass portion in the flow direction of the exhaust gas, in the joint portion jointing the second edge portion and the metal member.

With the structure, it is possible to secure jointing property of the joint portion, and the joint portion has high corrosion resistance with respect to the exhaust gas. And, it is possible to joint the first edge portion and the second edge portion of the ceramic member through which the exhaust gas passes to the metal member. And, with the structure, it is possible to strongly joint the ceramic member through which the exhaust gas passes to the metal member, compared to a case where the joint portion is provided only on one of the first edge portion and the second edge portion of the ceramic member through which the exhaust gas passes.

In the above-mentioned structure, the metal solder may include a noble metal. With the structure, it is possible to improve the corrosion resistance of the metal solder portion with respect to the gas. Thus, it is possible to improve the corrosion resistance of the joint structure with respect to the gas.

In the above-mentioned structure, the noble metal may be silver. The silver is especially cheap among a group of noble metal. Therefore, with the structure, it is possible to suppress increase of cost and improve corrosion resistance of the metal solder portion with respect to the gas. Thus, it is possible to suppress increase of cost and improve the corrosion resistance of the joint structure with respect to the gas. And, a melting point of the silver is especially low among the group of the noble metal. Therefore, it is possible to reduce stress (residual stress) left in the metal solder portion, after melted metal solder is cooled and is solidified.

Effects of the Invention

According to the present invention, it is possible to secure jointing property of a joint portion and provide a joint structure of a ceramic member and a metal member that has high corrosion resistance with respect to gas.

MODES FOR CARRYING OUT THE INVENTION

A description will be given of embodiments of the present invention with reference to drawings.
[First Embodiment]

A description will be given of a joint structure 20 of a ceramic member and a metal member in accordance with an embodiment of the present invention (hereinafter referred to as the joint structure 20). The joint structure 20 is a structure jointing a ceramic member and a metal member of a device that is provided at a portion through which gas passes. In the embodiment, exhaust gas of an internal combustion engine 1 is used as an example of the gas. An EGR (Exhaust Gas Recirculation) cooler 10 is used as an example of a device provided at a portion through which the exhaust gas of the internal combustion engine 1 passes. And so, a description will be given of an overall structure of the internal combustion engine 1 having the EGR cooler 10. Next, a description will be given of the joint structure 20.

Figure 1:
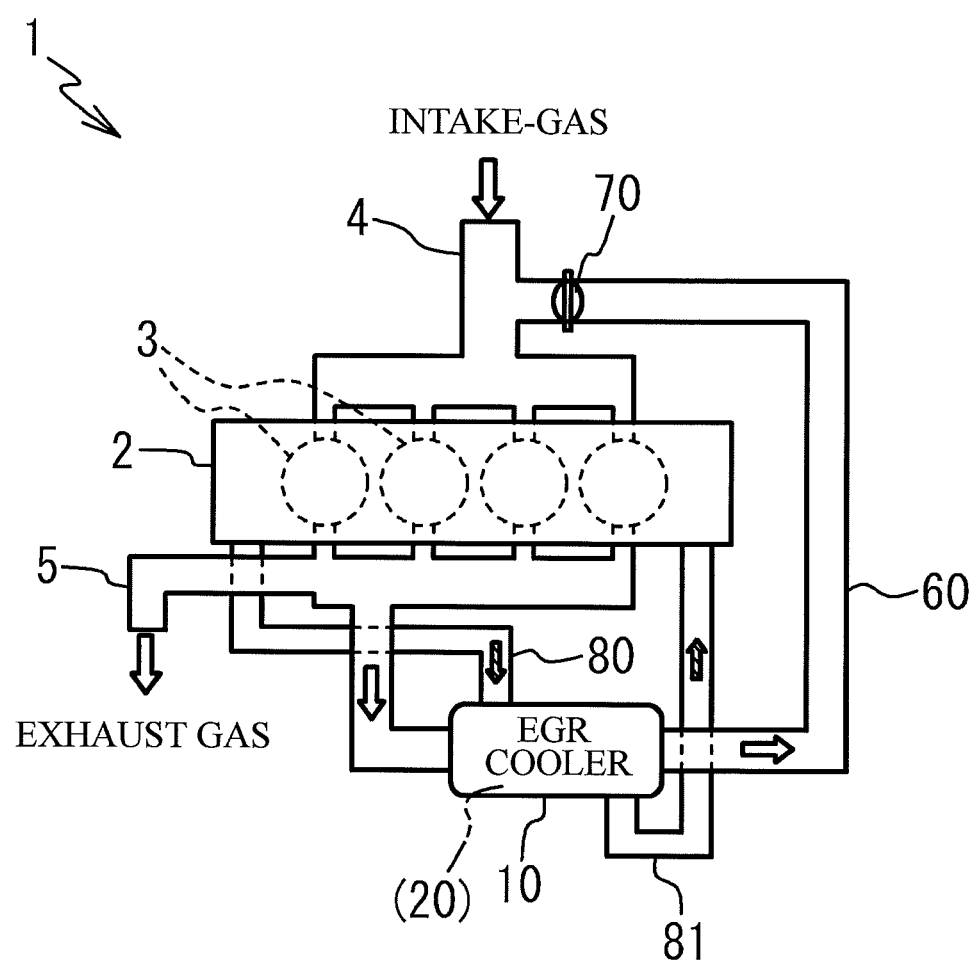
FIG. 1 schematically illustrates an internal combustion engine in accordance with an embodiment.

FIG. 1 schematically illustrates the internal combustion engine 1. The internal combustion engine 1 is mounted on a vehicle. A type of the internal combustion engine 1 is not limited. Various types of internal combustion engine such as a diesel engine or a gasoline engine can be used. In the embodiment, a gasoline engine is used as an example of the internal combustion engine 1. The internal combustion engine 1 has an engine main body 2 having a cylinder 3, an intake-gas passage 4 taking intake-gas in the cylinder 3, and an exhaust-gas passage 5 through which exhaust gas exhausted from the cylinder 3 passes. The engine main body 2 has a cylinder block in which the cylinder 3 is provided, a cylinder head provided on an upper part of the cylinder block, and a piston provided in the cylinder 3. In the embodiment, the number of the cylinder 3 is two or more (in concrete, four). However, the number of the cylinder 3 is not limited The internal combustion engine 1 has the EGR cooler 10, an EGR passage 60, an EGR valve 70 provided in the EGR passage 60, a coolant supply passage 80, and a coolant exhaust passage 81. The EGR passage 60 is a passage for re-circulating a part of the exhaust gas to an intermediate of the intake-gas passage 4. In concrete, the EGR passage 60 in accordance with the embodiment connects an intermediate of the intake-gas passage 4 and an intermediate of the exhaust-gas passage 5. Hereinafter, the exhaust gas passing through the EGR passage 60 is referred to as EGR gas. The EGR valve 70 receives an instruction from an ECU (Electronic Control Unit) acting as a controller, and opens and closes the EGR passage 60. The EGR valve 70 can adjust a flow amount of the EGR gas by opening and closing the EGR passage 60.

The EGR cooler 10 is provided in the EGR passage 60. That is, the EGR cooler 10 is a device that is provided at the portion (the EGR passage 60) through which the EGR gas (exhaust gas) passes. The EGR cooler 10 cools the EGR gas by thermal exchange between the coolant and the EGR gas. The coolant supply passage 80 is a coolant passage guiding the coolant of the coolant passage formed in the engine main body 2 (hereinafter referred to as an engine main body coolant passage) to the EGR cooler 10. The coolant exhaust passage 81 is a coolant passage for returning the coolant having passed through inside of the EGR cooler 10 to the engine main body coolant passage. The above-mentioned joint structure 20 is used in the EGR cooler 10.

Figure 2A:
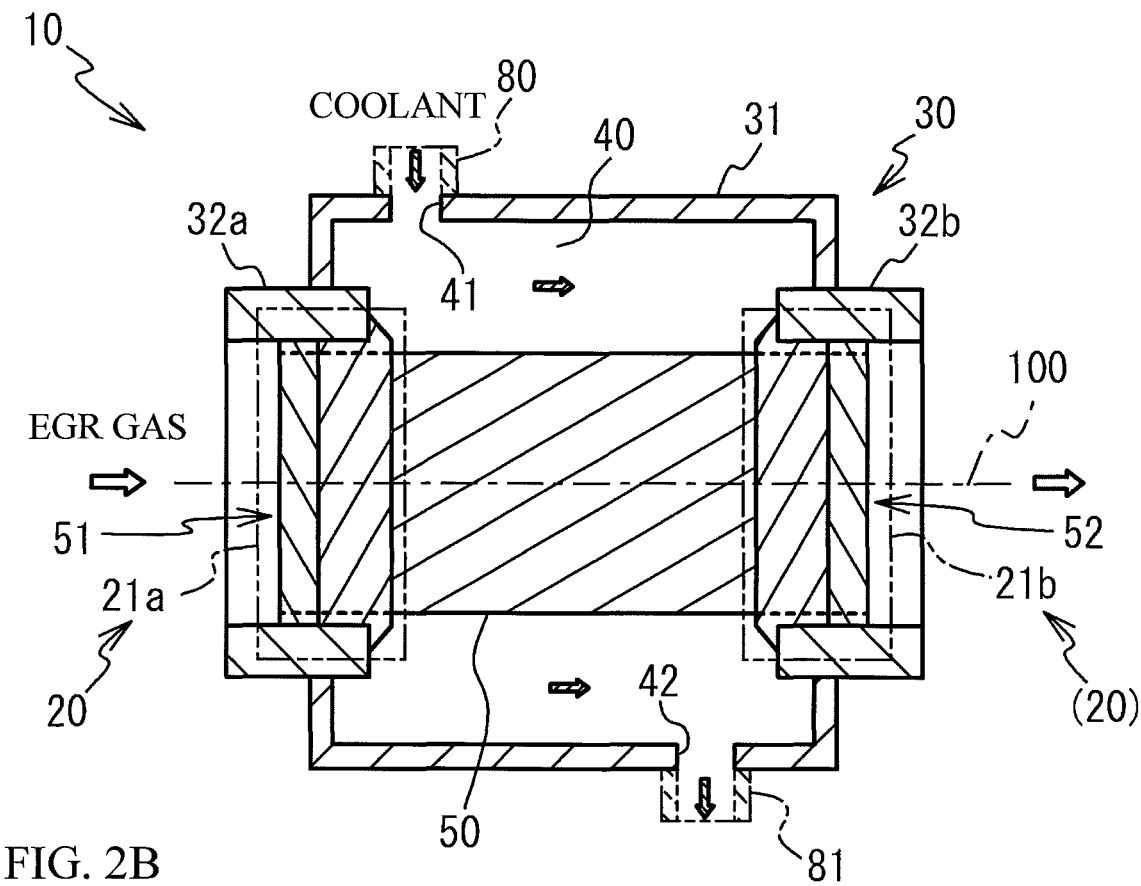
FIG. 2A schematically illustrates a cross section of an EGR cooler.

FIG. 2A schematically illustrates a cross section of the EGR cooler 10. The EGR cooler 10 has the above-mentioned joint structure 20, a housing 30 made of metal, a coolant passage 40 through which the coolant passes, and a heat exchanger 50 made of ceramics. The joint structure 20 in accordance with the embodiment joints the heat exchanger 50 acting as a ceramic member and the housing 30 acting as a metal member (in concrete, in the embodiment, ring members 32a and 32b described later). The joint structure 20 has a joint portion 21a and a joint portion 21b. Details of the joint portions 21a and 21b are described later.

An axis line 100 illustrated in FIG. 2A is a line indicating a center line of the housing 30 and the heat exchanger 50. Hereinafter, a direction along the axis line 100 is referred to as an axis line direction. In FIG. 2A, the EGR gas flows from left to right along the axis line direction. The EGR gas passes through inside of the heat exchanger 50. That is, the heat exchanger 50 in accordance with the embodiment is a ceramic member through which the EGR gas (that is, the exhaust gas) passes. A first edge portion on an upstream side of the flow direction of the EGR gas of two edge portions in the axis line direction of the heat exchanger 50 (a region from an edge face on the upstream side to a downstream side having a predetermined distance) is referred to as a first edge portion 51. A second edge portion on the downstream side of the flow direction of the EGR gas (a region from an edge face on the downstream side to the upstream side having a predetermined distance) is referred to as a second edge portion 52. In the following description, the upstream means an upstream in the flow direction of the EGR gas unless otherwise stated. The downstream means a downstream in the flow direction of the EGR gas unless otherwise stated.

Figure 2B:
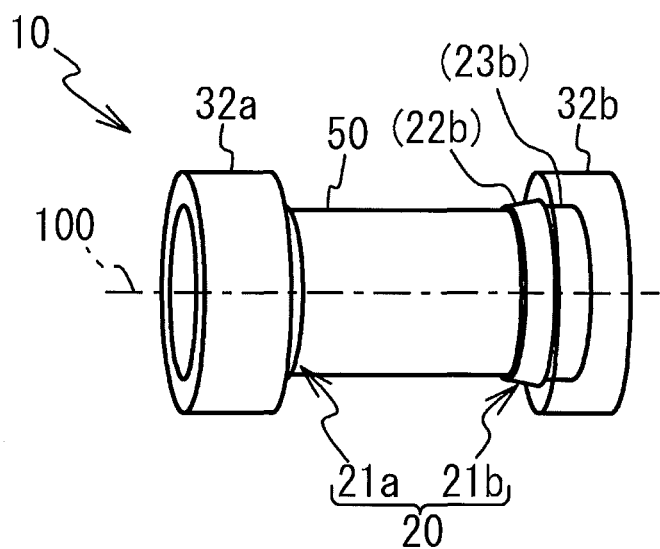
FIG. 2B schematically illustrates a perspective view of a heat exchanger of the EGR cooler, ring members, and a joint structure.

The housing 30 has an outer pipe 31 made of metal and the ring members 32a and 32b made of metal that are provided inside of the outer pipe 31. FIG. 2B schematically illustrates a perspective view of the heat exchanger 50 of the EGR cooler 10, the ring members 32a and 32b, and the joint structure 20. In FIG. 2B, a vicinity of the ring member 32b is seen through. As illustrated in FIG. 2A and FIG. 2B, the ring members 32a and 32b are metal members having a ring shape. The ring member 32a is jointed to the first edge portion 51 of the heat exchanger 50 with the joint portion 21a. The ring member 32b is jointed to the second edge portion 52 of the heat exchanger 50 with the joint portion 21b.

As illustrated in FIG. 2A, the outer pipe 31 has a substantially cylinder shape. A first edge portion of the outer pipe 31 on the upstream side and a second edge portion of the outer pipe 31 on the downstream side are bent toward inside thereof. The first edge portion of the outer pipe 31 on the upstream side is jointed to an outer circumference of the ring member 32a. The second edge portion of the outer pipe 31 on the downstream side is jointed to an outer circumference of the ring member 32b. In the embodiment, the outer pipe 31 and the ring members 32a and 32b are jointed by welding. However, a jointing method of the outer pipe 31 and the ring members 32a and 32b is not limited to the welding. Various jointing methods such as soldering by metal solder can be used.

Concrete types of the metal of the housing 30 (in concrete, the outer pipe 31 and the ring members 32a and 32b) are not limited. It is preferable that corrosion resistance of the metal with respect to the coolant is high, and the metal is inexpensive. Stainless (SUS) may be used as an example of the metal. And so, in the embodiment, the stainless is used as an example of a material of the housing 30. It is not necessary that metals of the outer pipe 31, the ring members 32a and 32b are identical. The metals may be different from each other.

The coolant passage 40 is provided in the EGR cooler 10 such that the coolant of the coolant passage 40 directly cools the outer circumference of the heat exchanger 50 (that is, the coolant directly contacts to the outer circumference of the heat exchanger 50). In concrete, the coolant passage 40 of the embodiment is formed in a space surrounded by the outer pipe 31, the heat exchanger 50, the ring members 32a and 32b, and the joint portions 21a and 21b. A part of the outer pipe 31 acting as a part of the coolant passage 40 has a coolant supply entrance 41 and a coolant exhaust exit 42. The coolant supply entrance 41 is connected to the coolant supply passage 80 described in FIG. 1. The coolant exhaust exit 42 is connected to the coolant exhaust passage 81 described in FIG. 1. The coolant having passed thorough the coolant supply passage 80 flows into the coolant passage 40 from the coolant supply entrance 41. The coolant having passed through the coolant passage 40 flows into the coolant exhaust passage 81 from the coolant exhaust exit 42.

Figure 2C:
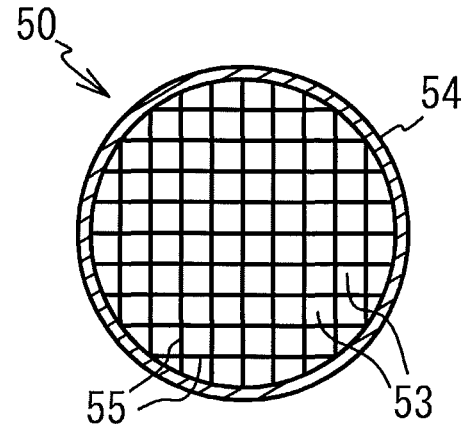
FIG. 2C schematically illustrates a cross section of the heat exchanger.

The heat exchanger 50 is a medium for conducting the heat of the EGR gas to the coolant. FIG. 2C schematically illustrates a schematic cross section of the heat exchanger 50. In concrete, FIG. 2C schematically illustrates a cross section of the heat exchanger 50 having a normal line direction as the axis line of the heat exchanger 50. The heat exchanger 50 of the embodiment has a plurality of inner gas passages 53 thorough which the EGR gas passes. The inner gas passages 53 are formed by sectioning an inside of an outer circumference member 54 structuring the outer circumference of the heat exchanger 50 with a plurality of separator wall members 55. In the embodiment, the outer circumference member 54 has a cylinder shape. However, the shape of the outer circumference member 54 is not limited to the cylinder shape. In the embodiment, the separator wall member 55 is arranged in a reticular pattern. However, the arrangement of the separator wall member 55 is not limited to the reticular pattern.

The concrete type of the ceramic that is the material of the heat exchanger 50 (in concrete, the material of the outer circumference member 54 and the separator wall member 55) is not specifically limited. However, it is preferable that the material is SiC. This is because the SiC is specifically appropriate for the material of the heat exchanger 50 for the EGR cooler 10, because the SiC has high conductivity among ceramics and has high corrosion resistance against the exhaust gas, the SiC has high workability, and the cost of the SiC is not high. And so, in the embodiment, ceramic including SiC is used as an example of the material of the heat exchanger 50. SiC (that is, SiC in which other dopant is not added), Si-impregnated SiC, (Si+Al)-impregnated SiC, a metallic composite SiC and so on can be used as concrete examples of the ceramic including the SiC. In the embodiment, Si-impregnated SiC is used as an example of the material of the heat exchanger 50.

The EGR cooler 10 operates as follows. When the EGR gas flows into the inner gas passage 53 of the heat exchanger 50, the heat of the EGR gas conducts the separator wall member 55 and conducts the outer circumference member 54. The heat having conducted the outer circumference member 54 is derived from the coolant of the coolant passage 40. In this manner, the EGR cooler 10 cools the heat of the EGR gas with the coolant. As mentioned above, the coolant passage 40 in accordance with the embodiment is provided so that the coolant directly cools the circumference of the heat exchanger 50. Therefore, cooling performance of the EGR gas of the EGR cooler 10 is higher than the case where a member is provided between the coolant passage 40 and the heat exchanger 50 (that is, the coolant indirectly cools the outer circumference of the heat exchanger 50).

Next, a description will be given of details of the joint structure, that is, details of the joint portions 21a and 21b. As illustrated in FIG. 2A and FIG. 2B, the joint portion 21a joints the first edge portion 51 of the heat exchanger 50 (the ceramic member) and the ring member 32a (that is, the metal member). The joint portion 21b joints the second edge portion 52 of the heat exchanger 50 and the ring member 32b.

Figure 3A:
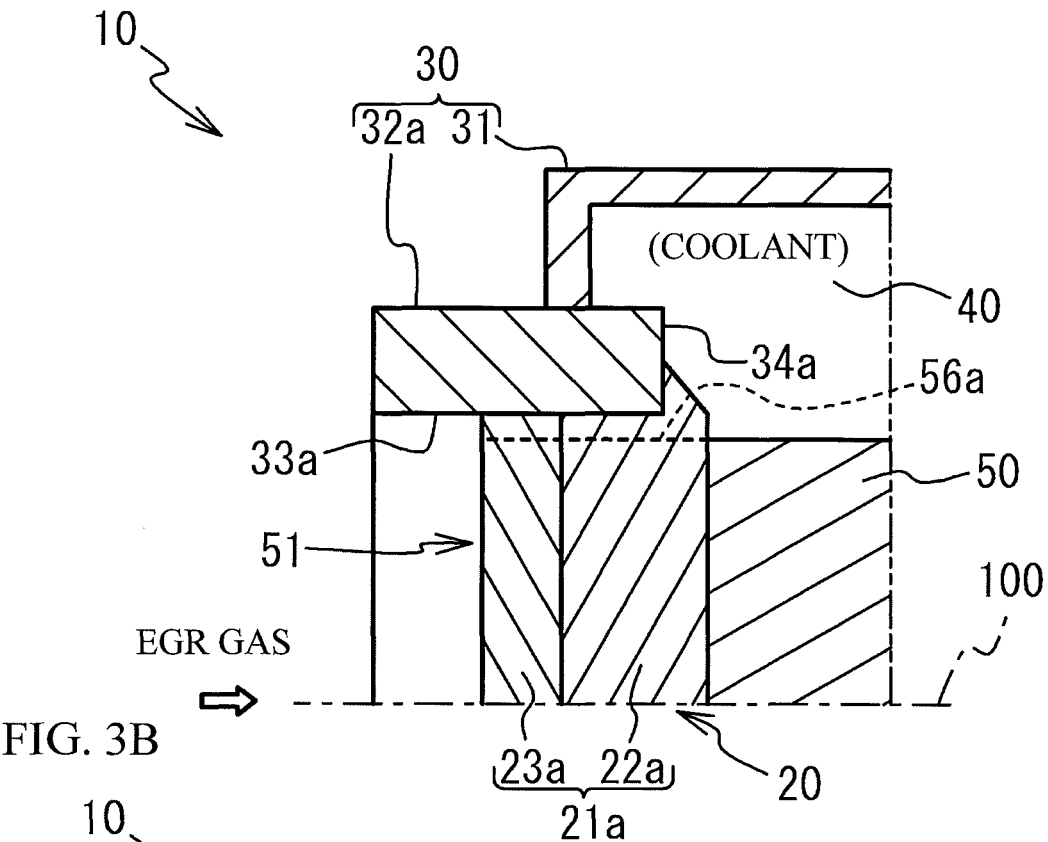
FIG. 3A schematically illustrates a cross section of an enlarged view of a first edge portion of the heat exchanger of the EGR cooler.
Figure 3B:
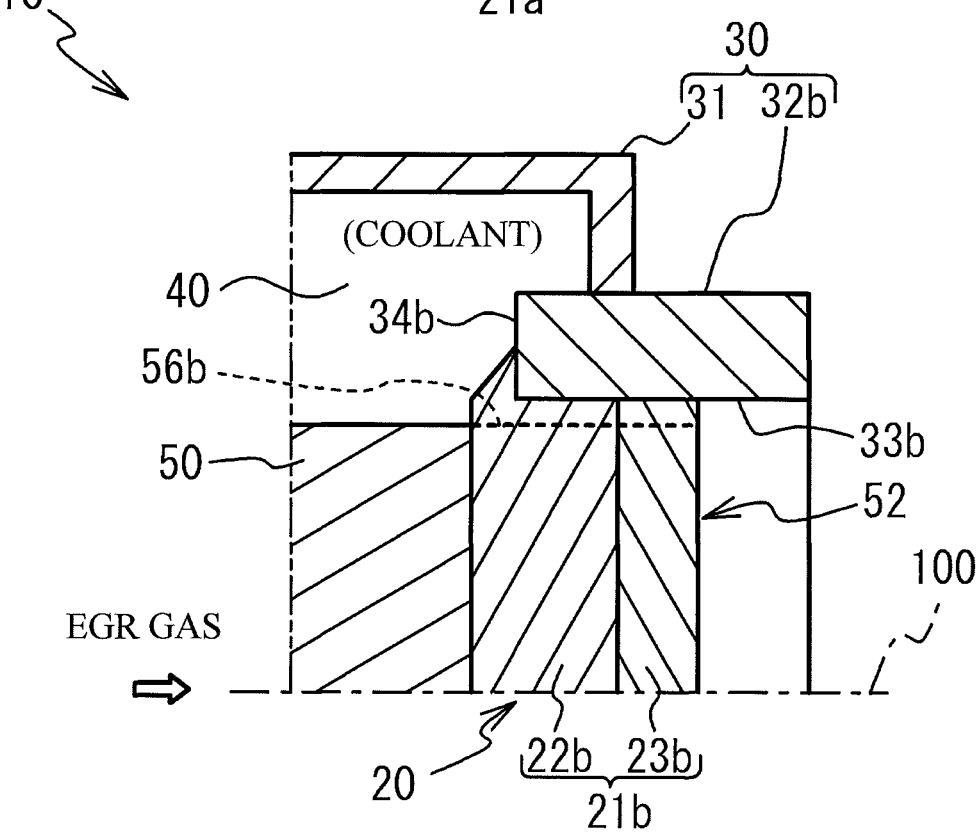
FIG. 3B schematically illustrates a cross section of an enlarged view of a second edge portion of the heat exchanger of the EGR cooler.

FIG. 3A schematically illustrates a cross section of an enlarged view of the first edge portion 51 of the heat exchanger 50 of the EGR cooler 10. FIG. 3B schematically illustrates a cross section of an enlarged view of the second edge portion 52 of the heat exchanger 50 of the EGR cooler 10. The joint portion 21a has a glass portion 22a and a metal solder portion 23a. The joint portion 21b has a glass portion 22b and a metal solder portion 23b. The glass portions 22a and 22b are made of glass. The metal solder portions 23a and 23b are made of metal solder having higher corrosion resistance with respect to the gas (in the embodiment, the exhaust gas) than the glass. Examples of the material of the glass and the metal solder is described later.

As illustrated in FIG. 3A, the metal solder portion 23a and the glass portion 22a are provided so that an area of the metal solder portion 23a contacting to the exhaust gas is larger than an area of the glass portion 22a contacting to the exhaust gas. As illustrated in FIG. 3B, the metal solder portion 23b and the glass portion 22b are provided so that an areas of the metal solder portion 23b contacting to the exhaust gas is larger than an area of the glass portion 22b contacting to the exhaust gas. In concrete, the joint portions 21a and 21b of the embodiment are described later.

As illustrated in FIG. 3A, the metal solder portion 23a in accordance with the embodiment is located on the upstream side compared to the glass portion 22a. The metal solder portion 23a is located between an inner circumference 33a of the ring member 32a and an outer circumference 56a of the first edge portion 51 of the heat exchanger 50. The metal solder portion 23a in accordance with the embodiment covers whole of the face of the glass portion 22a on the upstream side. Therefore, in the embodiment, the glass portion 22a does not contact to the exhaust gas. That is, an area where the metal solder portion 23a contacts to the exhaust gas is larger than an area where the glass portion 22a contacts to the exhaust gas (in the embodiment, zero). However, when the area where the metal solder portion 23a contacts to the exhaust gas is larger than the area where the glass portion 22a contacts to the exhaust gas, the glass portion 22a may contact to the exhaust gas. An example may be a structure where a part of the upstream side face of the glass portion 22a is not covered by the metal solder portion 23a.

The glass portion 22a is located on the downstream side compared to the metal solder portion 23a and is located between the inner circumference 33a of the ring member 32a and the outer circumference 56a of the first edge portion 51 of the heat exchanger 50. Thus, the glass portion 22a in accordance with the embodiment has a function as a joint member for jointing the heat exchanger 50 and the ring member 32a and has a function as a seal member for suppressing leakage of the coolant of the coolant passage 40 from between the heat exchanger 50 and the ring member 32a. An area where the glass portion 22a in accordance with the embodiment contacts to the heat exchanger 50 is larger than an area where the metal solder portion 23a contacts to the heat exchanger 50. And, an area where the glass portion 22a contacts to the ring member 32a is larger than an area where the metal solder portion 23a contacts to the ring member 32a.

The glass portion 22a in accordance with the embodiment is also located on a part of an edge face 34a of the ring member 32a on the downstream side. However, the structure of the glass portion 22a is not limited. For example, the glass portion 22a may not be located on the edge face 34a of the ring member 32a. However, when the glass portion 22a is located on the edge face 34a of the ring member 32a as in the case of the embodiment, the joint strength between the ring member 32a and the heat exchanger 50 can be improved. And, the leakage of the coolant of the coolant passage 40 to outside can be suppressed.

As illustrated in FIG. 3B, the structure of the joint portion 21b in accordance with the embodiment is bilaterally symmetrical to the above-mentioned structure of the joint portion 21a. In concrete, the metal solder portion 23b is located on the downstream side compared to the glass portion 22b. The metal solder portion 23b is located between an inner circumference 33b of the ring member 32b and an outer circumference 56b of the second edge portion 52 of the heat exchanger 50. The metal solder portion 23b in accordance with the embodiment covers whole of the face of the glass portion 22b on the downstream side. Therefore, in the embodiment, the glass portion 22b does not contact to the exhaust gas. That is, an area where the metal solder portion 23b contacts to the exhaust gas is larger than an area where the glass portion 22b contacts to the exhaust gas (in the embodiment, zero). However, when the area where the metal solder portion 23b contacts to the exhaust gas is larger than the area where the glass portion 22b contacts to the exhaust gas, the glass portion 22b may contact to the exhaust gas. An example may be a structure where a part of the downstream side face of the glass portion 22b is not covered by the metal solder portion 23b.

The glass portion 22b is located on the upstream side compared to the metal solder portion 23b and is located between the inner circumference 33b of the ring member 32b and the outer circumference 56b of the second edge portion 52 of the heat exchanger 50. Thus, the glass portion 22b in accordance with the embodiment has a function as a joint member for jointing the heat exchanger 50 and the ring member 32b and has a function as a seal member for suppressing leakage of the coolant of the coolant passage 40 from between the heat exchanger 50 and the ring member 32b. An area where the glass portion 22b in accordance with the embodiment contacts to the heat exchanger 50 is larger than an area where the metal solder portion 23b contacts to the heat exchanger 50. And, an area where the glass portion 22b contacts to the ring member 32b is larger than an area where the metal solder portion 23b contacts to the ring member 32b. The glass portion 22b in accordance with the embodiment is also located on a part of an edge face 34b of the ring member 32b on the upstream side. However, the structure of the glass portion 22b is not limited. For example, the glass portion 22b may not be located on the edge face 34b of the ring member 32b. However, when the glass portion 22b is located on the edge face 34b of the ring member 32b as in the case of the embodiment, the joint strength between the ring member 32b and the heat exchanger 50 can be improved. And, the leakage of the coolant of the coolant passage 40 to outside can be suppressed.

The joint portions 21a and 21b in accordance with the embodiment are formed by calcining. Details of the calcining are as follows. First, a metal solder that is a raw material of the metal solder portions 23a and 23b is located between the heat exchanger 50 and the ring members 32a and 32b as illustrated in FIG. 3A and FIG. 3B. After that, a first calcining is performed. Thus, the metal solder portions 23a and 23b are formed. Next, a glass that is a raw material of the glass portions 22a and 22b is located between the heat exchanger 50 and the ring members 32a and 32b as illustrated in FIG. 3A and FIG. 3B. After that, a second calcining is performed. Thus, the glass portions 22a and 22b are formed. With the calcining as mentioned above, the joint portions 21a and 21b are formed. However, a concrete forming method of the joint portions 21a and 21b is not limited to the calcining.

Next, a description will be given of a concrete example of materials of the glass portions 22a and 22b and the metal solder portions 23a and 23b. The glass that is a material of the glass portions 22a and 22b may be various glasses such as $SiO_2$, a glass in which a dopant such as $Al_2O_3$, CaO, $B_2O_3$, $K_2O$, ZnO, $ZrO_2$, $La_2O_3$, MgO is doped in $SiO_2$, or a partially crystallized glass. The partially crystallized glass is a glass in which a micro crystal of quartz is precipitated by performing a particular thermal treatment on a glass including lithium, aluminum or the like, and may be separately called a glass ceramic.

When the concrete material of the glass portions 22a and 22b is selected, it is preferable to consider the followings. It is preferable that the material of the glass portions 22a and 22b is a glass that has as high wettability as possible with respect to the ceramic of the jointed ceramic member and the metal of the metal member. It is more preferable that the material is a glass that has a thermal expansion rate between a ceramic and a metal.

The EGR cooler 10 in accordance with the embodiment may be heated by the heat of the exhaust gas. Therefore, it is preferable that the material of the glass portions 22a and 22b is a glass having a high thermal resistance (for example, thermal resistance of 800 degrees C.). As mentioned above, the glass portions 22a and 22b in accordance with the embodiment are formed by the calcining. Therefore, it is preferable that the glass can be calcinated at a temperature lower than the thermal resistance temperature of the heat exchanger 50 and the ring members 32a and 32b. Moreover, as mentioned above, the glass can be calcinated at a temperature that is lower than the calcining of the metal solder portions 23a and 23b, because the glass portions 22a and 22b are calcinated after the metal solder portions 23a and 23b. The glass portions 22a and 22b of the embodiment do not contact to the exhaust gas. Therefore, the corrosion resistance of the glass portions 22a and 22b with respect to the exhaust gas is out of problem. However, when the glass portions 22a and 22b contact to the exhaust gas, it is preferable that the glass portions 22a and 22b has as high corrosion resistance as possible with respect to the exhaust gas.

The glass in which a dopant such as $Al_2O_3$, $CaO$, $B_2O_3$, $K_2O$, $ZnO$, $ZrO_2$, $La_2O_3$, $MgO$ is doped in $SiO_2$ and a partially crystallized glass of the above-mentioned material of the glass satisfy the above-mentioned preferable conditions. Therefore, it is specifically preferable that a glass selected from the glass and the partially crystallized glass is used as the glass portions 22a and 22b. And so, in the embodiment, the glass in which $Al_2O_3$ is doped in $SiO_2$ is used as an example of the material of the glass portions 22a and 22b. The material of the glass portion 22a is not always the same as the material of the glass portion 22b. The material of the glass portion 22a may be different from the material of the glass portion 22b.

The material of the metal solder portions 23a and 23b is a solder of which main component is a metal having higher corrosion resistance with respect to the gas than the glass of the glass portions 22a and 22b. An adequate material may be selected in accordance with a type of gas passing through a device to which the joint structure 20 is adapted. For example, as in the case of the embodiment, when the gas passing through the device to which the joint structure 20 is adapted is the exhaust gas of the internal combustion engine 1, the metal solder of which main component is a metal having higher corrosion resistance with respect to the acid gas than the glass is used as the material of the metal solder portions 23a and 23b because the exhaust gas is acid. Alternatively, when the gas passing through the device to which the joint structure 20 is adapted has alkaline property, the metal solder of which main component is a metal having higher corrosion resistance with respect to the alkaline property gas than the glass is used as the material of the metal solder portions 23a and 23b.

Here, among metal solders having higher corrosion resistance with respect to the gas than the glass, a metal solder including a noble metal has specifically higher corrosion resistance with respect to the acid gas and the alkaline gas than the glass. And so, in the embodiment, the metal solder including the noble metal is used as an example of the material of the metal solder portions 23a and 23b. For example, platinum (Pt), rhodium (Rh), gold (Au), silver (Ag) or the like can be used as the noble metal of the metal solder. In the embodiment, silver is used as an example of the noble metal. That is, the metal solder of the metal solder portions 23a and 23b of the embodiment includes silver. A metal solder having silver as a main component in which copper (Cu), zinc (Zn), tin (Sn), titanium (Ti) or the like is doped can be used as a concrete example of the metal solder including silver. The material of the metal solder portion 23a is not always the same as the material of the metal solder portion 23b. The material of the metal solder portion 23a may be different from that of the metal solder portion 23b.

It is preferable that the material of the metal solder portions 23a and 23b is a metal solder that has as high wettability as possible with respect to the ceramic of the jointed ceramic member (SiC in the embodiment) and the metal of the metal member (SUS in the embodiment). It is more preferable that the material is a glass that has a thermal expansion rate between a ceramic and a metal. The EGR cooler 10 to which the metal solder portions 23a and 23b are adapted in accordance with the embodiment may be heated as mentioned above. Therefore, it is preferable that the material of the metal solder portions 23a and 23b is a metal solder having a high thermal resistance (for example, thermal resistance of 800 degrees C.). Moreover, the metal solder portions 23a and 23b in accordance with the embodiment are formed by the calcining as mentioned above. Therefore, it is preferable that the metal solder of the metal solder portions 23a and 23b can be calcinated at a calcination temperature lower than the thermal resistance temperature of the heat exchanger 50 and the ring members 32a and 32b. The metal solder including the above-mentioned noble metal satisfies these preferable conditions.

Next, a description will be given of a function effect of the joint structure 20 in accordance with the embodiment. First, glass has sufficient wettability with respect to a metal member and has higher wettability with respect to a ceramic member than metal solder. Therefore, it is possible to secure jointing property of the joint portions 21a and 21b, compared to a case where the joint portions 21a and 21b are made of only metal solder, because the joint portions 21a and 21b respectively have the glass portions 22a and 22b in the joint structure 20 in accordance with the embodiment. As a result, with the joint structure 20, even if the heat exchanger acting as a ceramic member and the ring members 32a and 32b acting as metal members thermally expand, it is possible to suppress peeling of the joint portions 21a and 21b from the heat exchanger 50 and the ring members 32a and 32b caused by the thermal expansion rate difference between the heat exchanger 50 and the ring members 32a and 32b. Therefore, the joint structure 20 of the embodiment can improve the joint strength of the joint portions 21a and 21b. In the embodiment, the metal solder of the metal solder portions 23a and 23b has higher corrosion resistance with respect to gas (in concrete, the exhaust gas in the embodiment) than the glass. The area where the metal solder portions 23a and 23b made of the metal solder contact to the gas is larger than the area where the glass portions 22a and 22b contact to the gas. Therefore, the joint structure 20 of the embodiment also has high corrosion resistance with respect to the gas.

In the joint structure 20 of the embodiment, as described with FIG. 3A and FIG. 3B, the ring member 32a is jointed to the first edge portion 51 of the heat exchanger 50 with the joint portion 21a, and the ring member 32b is jointed to the second edge portion 52 of the heat exchanger 50 with the joint portion 21b. And, the metal solder portion 23a is located on the upstream side with respect to the glass portion 22a in the flow direction of the exhaust gas (in concrete, the EGR gas in the embodiment). The metal solder portion 23b is located on the downstream side with respect to the glass portion 22b in the flow direction of the exhaust gas. With the structure of the joint structure 20, it is possible to secure the jointing property of the joint portions 21a and 21b. And it is possible to joint the ring members 32a and 32b (that is, metal members) to the first edge portion 51 and the second edge portion 52 of the heat exchanger 50 (that is, a ceramic member) having high corrosion resistance with respect to the exhaust gas, through which the exhaust gas passes.

In the embodiment, in both of the first edge portion 51 and the second edge portion 52 of the heat exchanger 50, the joint structure 20 in accordance with the embodiment is used. However, the structure is not limited. However, the joint structure 20 may be provided only one of the first edge portion 51 and the second edge portion 52 of the heat exchanger 50. However, the case where the joint structure 20 is provided in the both of the first edge portion 51 and the second edge portion 52 of the heat exchanger 50 as in the case of the embodiment is more preferable than the case where the joint structure 20 is provided in only one of the first edge portion 51 and the second edge portion 52 of the heat exchanger 50, in a point that the heat exchanger 50 and the ring members 32a and 32b can be strongly jointed.

With the joint structure 20 in accordance with the embodiment, it is possible to secure the jointing property of the joint portions 21a and 21b as mentioned above. It is therefore possible to suppress the leakage of the coolant of the coolant passage 40 from between the heat exchanger 50 and the ring members 32a and 32b.

In the embodiment, metal solder including noble metal is used as the material of the metal solder portions 23a and 23b. Therefore, the corrosion resistance of the metal solder portions 23a and 23b with respect to the exhaust gas is improved, compared to the case where metal solder not including noble metal is used as the material of the metal solder portions 23a and 23b. Thus, the corrosion resistance of the joint structure 20 with respect to the exhaust gas is more improved.

In the embodiment, silver is used as an example of the noble metal. Here, silver is especially inexpensive among a group of the noble metal. Thus, the joint structure 20 in accordance with the embodiment can suppress increase of cost and improve the corrosion resistance of the metal solder portions 23a and 23b with respect to the exhaust gas. As a result, it is possible to suppress the increase of cost and improve the corrosion resistance of the joint structure 20 with respect to the exhaust gas. A melting point of silver is especially low among the group of the noble metal. Thus, it is possible to reduce stress (residual stress) left in the metal solder portions 23a and 23b, after melted metal solder is cooled and is solidified. As a result, it is possible to suppress deformation of the metal solder portions 23a and 23b caused by the residual stress of the metal solder portions 23a and 23b and cracking of the heat exchanger 50 caused by the deformation of the metal solder portions 23a and 23b.

The glass that is the material of the glass portions 22a and 22b is cheaper than the metal solder including noble metal. Therefore, with the joint structure 20 in accordance with the embodiment, it is possible to secure the jointing property of the joint portions 21a and 21b and reduce cost, compared to the case where the whole of the joint portions 21a and 21b are made of the metal solder including the noble metal.

As described with FIG. 3A and FIG. 3B, in the embodiment, the area where the glass portions 22a and 22b contact to the heat exchanger 50 is larger than the area where the metal solder portions 23a and 23b contact to the heat exchanger 50, and the area where the glass portions 22a and 22b contact to the ring members 32a and 32b is larger than the area where the metal solder portions 23a and 23b contact to the ring members 32a and 32b. However, the structure of the glass portions 22a and 22b and the metal solder portions 23a and 23b is not limited. For example, the area where the glass portions 22a and 22b contact to the heat exchanger 50 may be equal to or smaller than the area where the metal solder portions 23a and 23b contact to the heat exchanger 50. The area where the glass portions 22a and 22b contact to the ring members 32a and 32b may be equal to or smaller than the area where the metal solder portions 23a and 23b contact to the ring members 32a and 32b. However, it is preferable that the area where the glass portions 22a and 22b contact to the heat exchanger 50 is larger than the area where the metal solder portions 23a and 23b contact to the heat exchanger 50 and the area where the glass portions 22a and 22b contact to the ring members 32a and 32b is larger than the area where the metal solder portions 23a and 23b contact to the ring members 32a and 32b, in a point that joint strength of the joint portions 21a and 21b can be more improved.

In the embodiment, the EGR cooler 10 that is provided on a portion through which the exhaust gas of the internal combustion engine 1 passes is used as an example of the device to which the joint structure 20 is adapted (in concrete, a device provided on a portion through which gas passes). However, the device to which the joint structure 20 is adapted is not limited to the EGR cooler 10. For example, the joint structure 20 is adapted not only to a device that is provided on a portion through which acid gas such as the exhaust gas of the internal combustion engine 1 passes, but also to a device that is provided on a portion through which alkaline gas passes. In the case, with the joint structure 20 in accordance with the embodiment, it is possible to secure the jointing property of the joint portions 21a and 21b and achieve high corrosion resistance with respect to the gas.

The embodiments of the present invention are described. However, the present invention is not limited to the specifically disclosed embodiments and variations but may include other embodiments and variations without departing from the scope of the present invention.

DESCRIPTION OF LETTERS OR NUMERALS

1 Internal combustion engine
10 EGR cooler
20 Joint structure
21a, 21b Joint portion
22a, 22b Glass portion
23a, 23b Metal solder portion
32a, 32b Ring member
50 Heat exchanger
51 First edge portion
52 Second edge portion

The invention claimed is:

1. A heat exchanger through which exhaust gas of an internal combustion engine passes therethrough, the heat exchanger comprising:
 a ceramic member having a first end, a second end, and a middle portion extending therebetween, and a plurality of inner passages through which the exhaust gas flows from the first end to the second end;
 first and second metal members, the first metal member located on the first end side of the ceramic member and the second metal member located on the second end side of the ceramic member;
 a first joint structure having at least a portion positioned, in a flow direction of the exhaust gas, between the first metal member and the first end of the ceramic member, and downstream of the first metal member; and a second joint structure having at least a portion positioned, in the flow direction of the exhaust gas, between the second end of the ceramic member and the second metal member, and upstream of the second metal member,
wherein the first joint structure joining the first metal member to the first end side of the ceramic member, and
wherein the second joint structure joining the second metal member to the second end side of the ceramic member,
each first and second joint structure further comprising:
a glass portion; and
a metal solder portion having higher corrosion resistance with respect to the exhaust gas than the glass portion,
wherein the glass portion is positioned closer to the middle portion of the ceramic member than the metal solder portion.

2. The heat exchanger as claimed in claim 1, wherein the metal solder includes a noble metal.

3. The heat exchanger as claimed in claim 2, wherein the noble metal is silver.

\* \* \* \* \*